(12) United States Patent
Raybern

(10) Patent No.: US 12,703,487 B2
(45) Date of Patent: Aug. 11, 2026

(54) MECHANICAL LOGIC-GATE PIVOT TUBE

(71) Applicant: Textron Aviation Inc., Wichita, KS (US)

(72) Inventor: Blake David Raybern, Wichita, KS (US)

(73) Assignee: Textron Innovations Inc., Providence, RI (US)

(*) Notice: Subject to any disclaimer, the term of this patent is extended or adjusted under 35 U.S.C. 154(b) by 213 days.

(21) Appl. No.: 18/790,238

(22) Filed: Jul. 31, 2024

(65) Prior Publication Data

US 2025/0058879 A1 Feb. 20, 2025

Related U.S. Application Data

(60) Provisional application No. 63/519,377, filed on Aug. 14, 2023.

(51) Int. Cl.
*B60N 2/14* (2006.01)
*B64D 11/06* (2006.01)

(52) U.S. Cl.
CPC .............. *B64D 11/064* (2014.12); *B60N 2/14* (2013.01)

(58) Field of Classification Search
CPC ...... B64D 11/064; B60N 2/14; B60N 2/3052; B60N 2/0742
See application file for complete search history.

(56) References Cited

U.S. PATENT DOCUMENTS

| | | | | |
|---|---|---|---|---|
| 6,691,970 | B1 * | 2/2004 | Sutton, Sr. | B60N 2/14 248/425 |
| 9,738,388 | B2 * | 8/2017 | Oleson | B60N 2/0025 |
| 9,908,446 | B2 * | 3/2018 | Davis | B60N 2/02246 |
| 9,926,079 | B2 | 3/2018 | Baker et al. | |
| 10,829,222 | B2 | 11/2020 | De La Garza et al. | |
| 10,906,650 | B2 * | 2/2021 | Suarez | B64D 11/064 |
| 11,542,014 | B2 * | 1/2023 | Oleson | B64D 11/0648 |
| 11,613,361 | B2 * | 3/2023 | Koustubhan | B64D 11/0639 297/344.12 |
| 12,428,162 | B2 * | 9/2025 | Marutzky | B60N 2/0862 |
| 2024/0253530 | A1 * | 8/2024 | Raybern | B60N 2/146 |
| 2025/0368096 | A1 * | 12/2025 | Vetere, II | B60N 2/14 |

FOREIGN PATENT DOCUMENTS

| | | | |
|---|---|---|---|
| CN | 120922001 A * | 11/2025 | B60N 2/146 |
| EP | 3626618 B1 | 3/2020 | |

* cited by examiner

*Primary Examiner* — Timothy J Brindley
(74) *Attorney, Agent, or Firm* — Avek IP, LLC

(57) ABSTRACT

A mechanical logic gate system for an aircraft seat which includes a flywheel operatively connected to a pivot tube and control cables. The control cables attach to swivel locking and tracking mechanisms which enable swiveling and tracking of the aircraft seat. Spring pin plungers are configured to extend into the flywheel for locking it in place. When both spring pin plungers are retracted from the flywheel via control cables, the aircraft seat is disabled from swiveling.

20 Claims, 17 Drawing Sheets

| INPUTS | | OUTPUT |
|---|---|---|
| SEAT SWIVELED FORWARD/ AFT FACING ON PEDESTAL | SEAT TRACKED FULLY AFT ON PEDESTAL | SWIVEL LOCKING MECH. CABLE THROW DISTANCE |
| FALSE (0) | FALSE (0) | 0.65-INCH |
| FALSE (0) | TRUE (1) | 0.65-INCH |
| TRUE (1) | FALSE (0) | 0.65-INCH |
| TRUE (1) | TRUE (1) | 0.0-INCH |

FIG. 9

| INPUTS | | OUTPUT |
|---|---|---|
| SEAT SWIVELED FORWARD/ AFT FACING ON PEDESTAL | SEAT TRACKED FULLY AFT ON PEDESTAL | SWIVEL LOCKING MECH. CABLE THROW DISTANCE |
| FALSE (0) | FALSE (0) | 0.65-INCH |
| FALSE (0) | TRUE (1) | 0.55-INCH |
| TRUE (1) | FALSE (0) | 0.55-INCH |
| TRUE (1) | TRUE (1) | 0.45-INCH |

FIG. 14

MECHANICAL LOGIC-GATE PIVOT TUBE

CROSS-REFERENCE TO RELATED APPLICATIONS

This application claims the benefit of U.S. Provisional Patent Application No. 63/519,377, filed Aug. 14, 2023, the entire contents thereof are herein incorporated by reference.

BACKGROUND OF THE INVENTION

1. Field

The disclosed embodiments relate generally to the field of aircraft seating. More specifically, the disclosed embodiments relate to adjustment mechanisms for aircraft seats.

2. Description of the Related Art

It is previously known for a seat bottom to move between a stationary position and a movable position. For example, in U.S. Pat. No. 9,926,079 B2 to Baker et al. describes a seat bottom that locks during taxi, takeoff, and landing (TTOL) phases of aircraft flight using a linkage and spring assembly. The seat bottom moves to a stationary position during TTOL and a freed position during flight which satisfy upright sitting position requirements during the TTOL phases of a flight.

It is also known for an aircraft seat to be adjusted to a reclined sitting position suitable for the TTOL phases of a flight. For example, in U.S. Pat. No. 10,829,222 B2 to De La Garza et al. describes an aircraft seat which reclines during TTOL such that a passenger's knee is positioned above their hip region preventing forward movement of the passenger. A range of motion is achievable for the aircraft seat using rotary actuators and gears that engage with a geared sector arm.

It is also known for a track and swivel mechanism to be incorporated within an aircraft seat. For example, European Patent No. EP3626618B1 to Suarez et al. describes a dynamic retention system implemented for forward facing conditions. The retention system includes an actuation assembly and swivel tracking mechanism to control an aircraft seat during TTOL phases of flight.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a mechanical logic-gate system for an aircraft seat including: a flywheel having a first control arm and a second control arm, wherein the flywheel is operatively coupled to a pivot tube configured to control a plurality of control cables; a first spring pin plunger configured to disengage with the first control arm via tensioning of a first cable, and a second spring pin plunger configured to disengage with the second control arm via tensioning of a second cable; and a return spring configured to bias rotation of the flywheel in a first direction such that upon the first and second spring pin plungers both being disengaged with the first and second control arms of the flywheel, respectively, the return spring rotates the flywheel thereby disabling swiveling capability of the aircraft seat; and the aircraft seat being enabled to swivel when at least one of the first or second spring pin plungers are engaged with the first or second control arms of the flywheel, respectively.

In some embodiments, the techniques described herein relate to a system wherein the first cable is a forward-facing limit cable and the second cable is an aft-tracking limit cable.

In some embodiments, the techniques described herein relate to a system wherein the swivel of the aircraft seat to a forward-facing orientation causes the forward-facing limit cable to be tensioned when the aircraft seat is swiveled to a forward-facing orientation and tracking the aircraft seat to a fully aft position causes the aft-tracking limit cable to be tensioned when the aircraft seat is tracked to a fully aft position.

In some embodiments, the techniques described herein relate to a system wherein when the first and second spring pin plungers are disengaged, the return spring causes the flywheel to rotate which creates a reduction of tension in a swivel locking control cable thereby triggering engagement of a swivel locking mechanism to disable swiveling capability of the aircraft seat.

In some embodiments, the techniques described herein relate to a system wherein the swivel locking mechanism includes a swivel locking plate configured to engage with the swivel locking control cable to disable swiveling of the aircraft seat.

In some embodiments, the techniques described herein relate to a system including a first spring pin-pivot tube mounting enclosure and a second spring pin-pivot tube mounting enclosure, wherein the first and second spring pin-pivot tube mounting enclosures each secure the first and second spring pin plungers, respectively, onto the pivot tube.

In some embodiments, the techniques described herein relate to a mechanical logic-gate system for an aircraft seat including: a mechanical logic-gate operatively coupled to a pivot tube, wherein the pivot tube is operatively coupled to a plurality of control cables for controlling a plurality of seat adjustment locking mechanisms by rotating about a longitudinal axis of the pivot tube, the mechanical logic-gate including: a flywheel having a first control arm and a second control arm, wherein the flywheel is configured to rotate about the pivot tube independently of the pivot tube; a swivel locking control cable operatively coupling the flywheel to a swivel locking mechanism; a first spring pin plunger mechanically coupled to the pivot tube on a first side of the flywheel, wherein the first spring pin plunger includes a spring-loaded pin extending from a first limit cable; and a second spring pin plunger mechanically coupled to the pivot tube on a second side of the flywheel opposite the first side, wherein the second spring pin plunger includes a spring-loaded pin extending from second limit cable, wherein the first spring pin plunger is configured to insert into a hole of the first control arm of the flywheel and the second spring pin plunger is configured to extend into a hole of the second control arm of the flywheel such that the flywheel actuates the swivel locking mechanism based on tension of the first limit cable and/or the second limit cable, wherein the actuation of the swivel locking mechanism is achieved by rotation of the pivot tube based on coupling of the pivot tube and the flywheel.

In some embodiments, the techniques described herein relate to a system wherein extension of at least one of the first and second spring pin plungers into the first or second control arm of the flywheel causes the aircraft seat to be enabled to swivel and track.

In some embodiments, the techniques described herein relate to a system wherein retraction of both the first and second spring pin plungers from the first and second control arms of the flywheel, causes the aircraft seat to be disabled to swivel and enabled to track.

In some embodiments, the techniques described herein relate to a system including a handle, wherein engagement of the handle is configured to add tension to a swivel locking control cable for disengaging the swivel locking mechanism, enabling swiveling of the aircraft seat, and, when disengaged, the handle causes the swivel locking control cable to relax which engages the swivel locking mechanism and disables swiveling of the aircraft seat.

In some embodiments, the techniques described herein relate to a system wherein the swivel locking mechanism includes a pin configured to extend and retract in a hole formed in a swivel locking plate wherein tension in the swivel locking control cable pulls the pin out of the swivel locking plate and enables swiveling of the aircraft seat, and slack in the swivel locking control cable extends the pin into the swivel locking plate and disables swiveling of the aircraft seat.

In some embodiments, the techniques described herein relate to a system wherein the first limit cable causes the first spring pin plunger to retract from the first control arm when the aircraft seat is forward-facing.

In some embodiments, the techniques described herein relate to a system wherein a forward-facing limiter system includes: a swivel plate rotatably mounted to a swivel locking plate; and a swing arm configured to follow an outer edge of the swivel locking plate wherein the outer edge includes an extended groove profile.

In some embodiments, the techniques described herein relate to a system wherein the swing arm is attached to the first limit cable and is configured to tension the first limit cable when the swing arm follows the extended groove profile.

In some embodiments, the techniques described herein relate to a system wherein the extended groove profile is positioned on the swivel locking plate corresponding to a position where the aircraft seat is forward facing.

In some embodiments, the techniques described herein relate to a system wherein the second limit cable retracts the second spring pin plunger from the second control arm when the aircraft seat is in a fully-aft position.

In some embodiments, the techniques described herein relate to a system wherein an aft-tracking limiter system includes a bucket frame and a lever arm configured to add tension to the second limit cable when the aircraft seat is tracked fully aft on the bucket frame.

In some embodiments, the techniques described herein relate to a system including a returning mechanism configured to rotate the flywheel and therefore the pivot tube when both the first and second spring pin plungers are retracted from the first and second control arms, respectively.

In some embodiments, the techniques described herein relate to a mechanical logic-gate system for an aircraft seat including: a flywheel operatively coupled to a pivot tube and to a plurality of control cables wherein the pivot tube is configured to rotate independently of the flywheel when a first and second spring pin plunger are disengaged from the flywheel; the aircraft seat being disabled from swiveling when the first and second spring pin plungers are retracted from the flywheel; and the aircraft seat being enabled to swivel when at least one of the first or second spring pin plungers are engaged with the flywheel causing the pivot tube to rotate with the flywheel.

In some embodiments, the techniques described herein relate to a system wherein a forward-facing limiter system controls the engagement/disengagement of the first spring pin plunger with the flywheel and an aft-tracking limiter system controls the engagement/disengagement of the second spring pin plunger with the flywheel such that the aircraft seat is automatically prevented from moving when the seat is fully-aft and forward facing.

BRIEF DESCRIPTION OF SEVERAL VIEWS OF THE DRAWINGS

Illustrative embodiments are described in detail below with reference to the attached drawing figures, which are incorporated by reference herein and wherein:

FIG. 9 is an input and output table for the mechanical logic-gate pivot tube of FIG. 1;

FIG. 14 is an input and output table for the control horn logic-gate pivot tube of FIG. 10.

Figure 1:
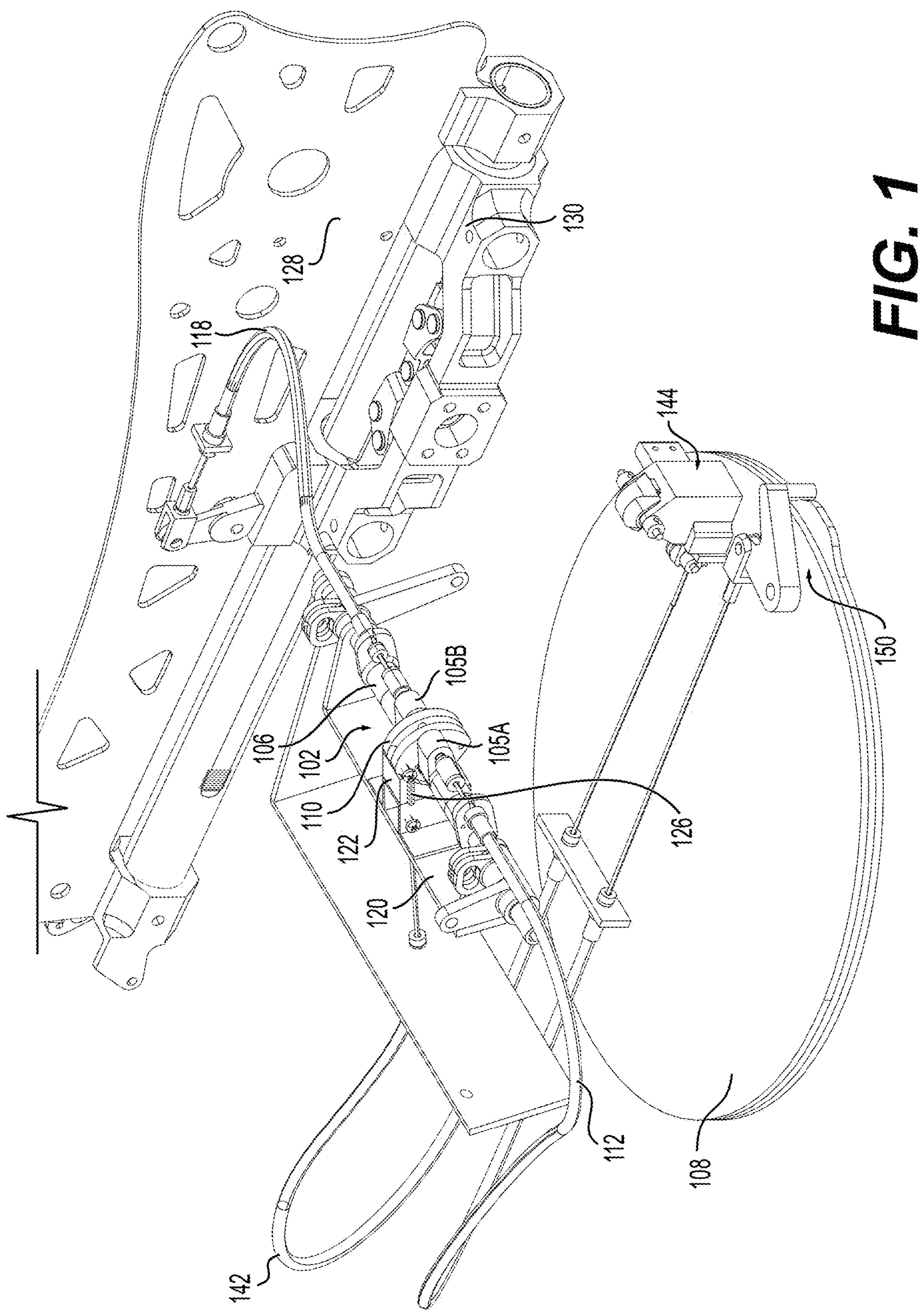
FIG. 1 is a top perspective view of a mechanical logic-gate pivot tube, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein provide a system and method for aircraft seating that substantially improves passenger comfort. Current FAA (Federal Aviation Administration) regulations require that passenger seats in the cabin of an aircraft are swiveled to a forward-facing position during the taxi, takeoff, and landing (TTOL) phases of aircraft flight for passenger safety. A TTOL seat configuration may be defined as being tracked all the way aft, outboard, and swiveled to face forward. In existing aircraft, no mechanisms are in place to prevent a passenger from tracking and/or swiveling out of the TTOL configuration. Future FAA guidance may allow passengers to move inboard/outboard while in the TTOL configuration to take advantage of aisle space while still maintaining a forward-facing orientation. To accommodate this capability, a mechanism is needed that prevents the passenger from accidentally enabling the swiveling motion while they are moving their seat in the inboard/outboard direction. Disclosed within embodiments is a mechanical arrangement including a mechanical logic-gate pivot tube that prevents unlocking of a swiveling mechanism while enabling inboard/outboard seat tracking.

The mechanical logic-gate is a mechanical system that enables a logic based operation. The mechanical logic-gate mimics a digital logic gate in which a logical conjunction is implemented from mathematical logic. The mechanical logic-gate accepts more than one mechanical input and returns at least one mechanical output. Example inputs include a position and an orientation of a passenger seat. For example, the position may include whether the seat is tracked in a forward or aft position and the orientation may include whether the seat is swiveled to be forward facing. An example output is an ability to move the seat in an inboard/outboard direction. In embodiments, the mechanical logic-gate is configured as an AND gate in which an output is enabled only when two inputs are met. For example, when the seat is tracked fully aft and swiveled to be forward facing (i.e., in the TTOL configuration), an inboard/outboard tracking mechanism is unlocked enabling inboard/outboard tracking by the passenger; however, the swiveling mechanism remains locked such that the passenger is prevented from releasing the swiveling mechanism to prevent unintentional swiveling of the seat to a non-forward-facing orientation.

Shown in FIG. 1, in a preferred embodiment, the mechanical logic-gate 102 is shown. The swiveling ability of the seat is substantially controlled using the mechanical logic-gate 102, one or more springs, and a plurality of cables. The mechanical logic-gate 102 a flywheel 110 and a return spring 126 mechanism designed to reset the output status of the flywheel 110 when certain input conditions are met. The flywheel 110 comprises a first flywheel control arm 110A and a second flywheel control arm 110B coincident with spring pin-pivot tube mounting enclosures 105A and 105B which encase and secure the spring pin plungers 104A and 104B onto a pivot tube 106. The flywheel 110 is also mounted onto the pivot tube 106 and is capable of rotating independently with respect to the pivot tube 106 under certain conditions described below.

Figure 2A:
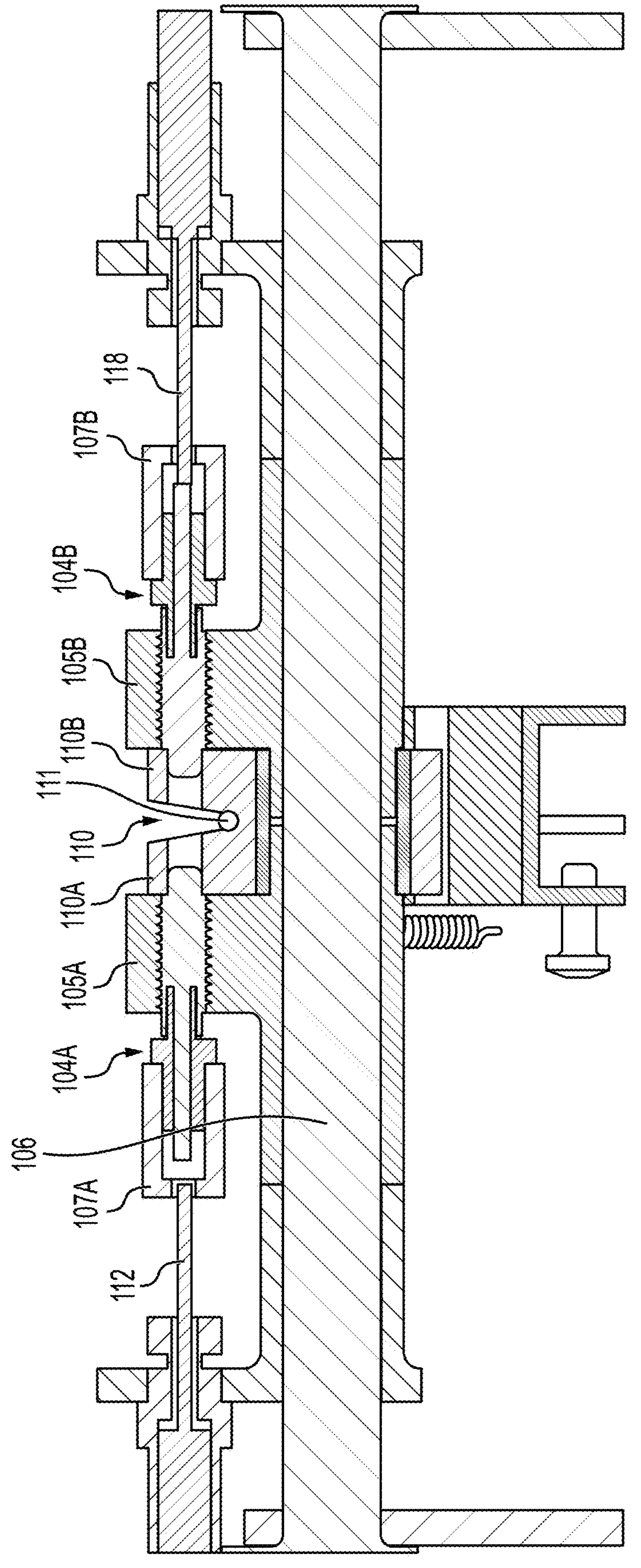
FIG. 2A is a cross-sectional view showing both spring pin plungers engaged with the flywheel to illustrate the operation of the mechanical logic-gate pivot tube of FIG. 1 in accordance with some embodiments.
Figure 3:
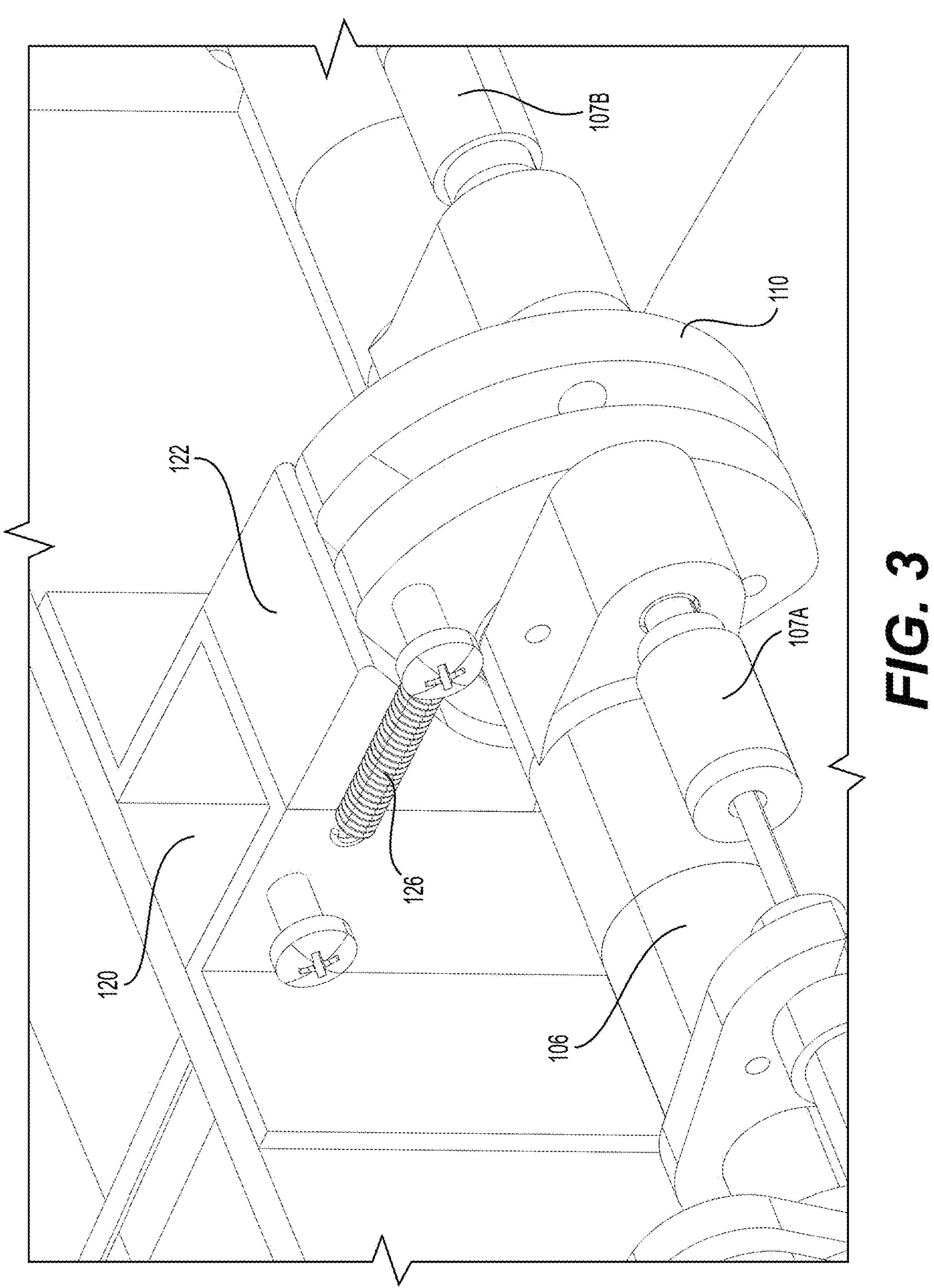
FIG. 3 is a close-up perspective view of the mechanical logic-gate pivot tube of FIG. 1.
Figure 5:
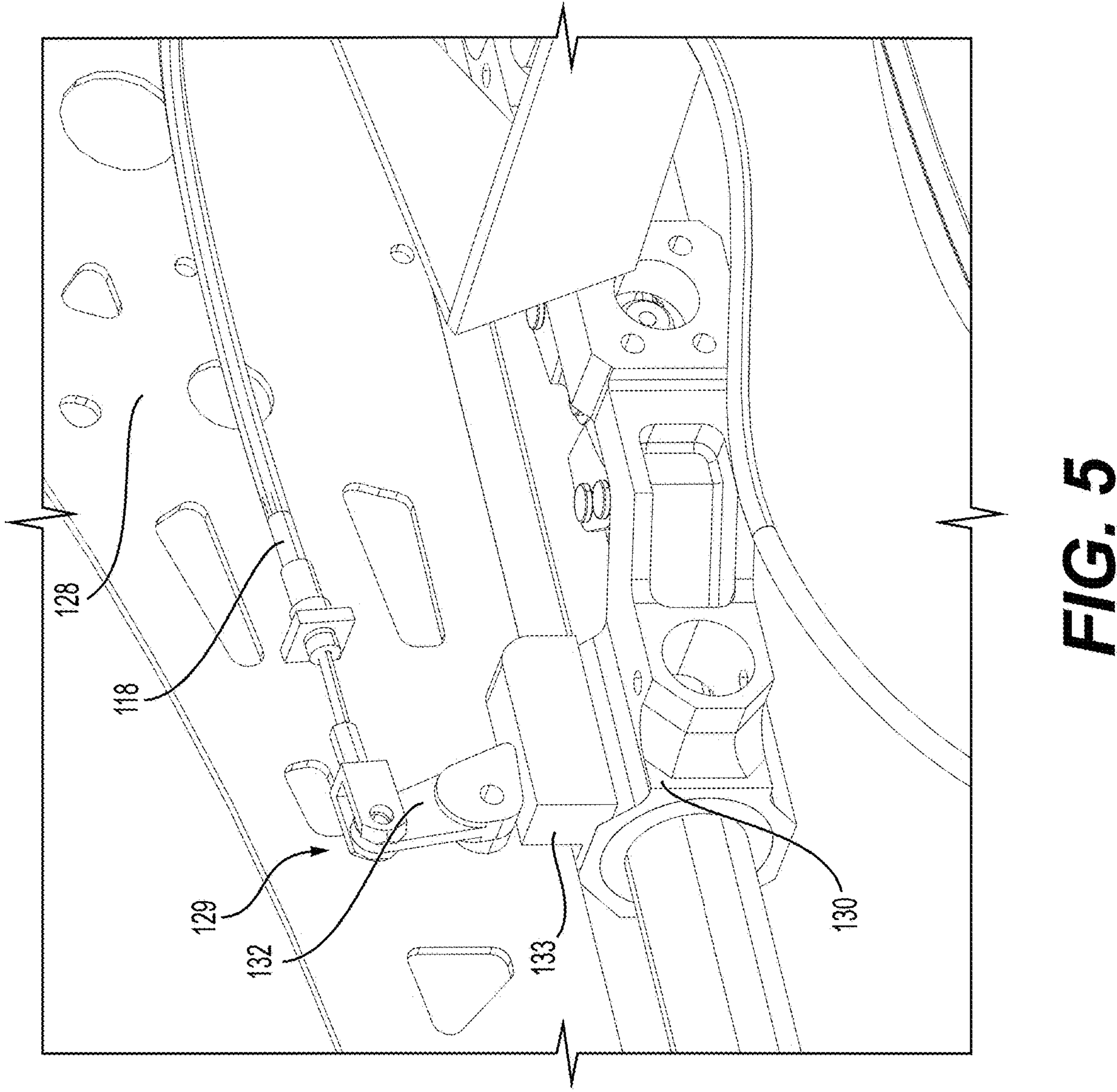
FIG. 5 shows an aft-tracked limit system of the mechanical logic-gate pivot tube of FIG. 1 and the control horn logic-gate pivot tube of FIG. 10.
Figure 8:
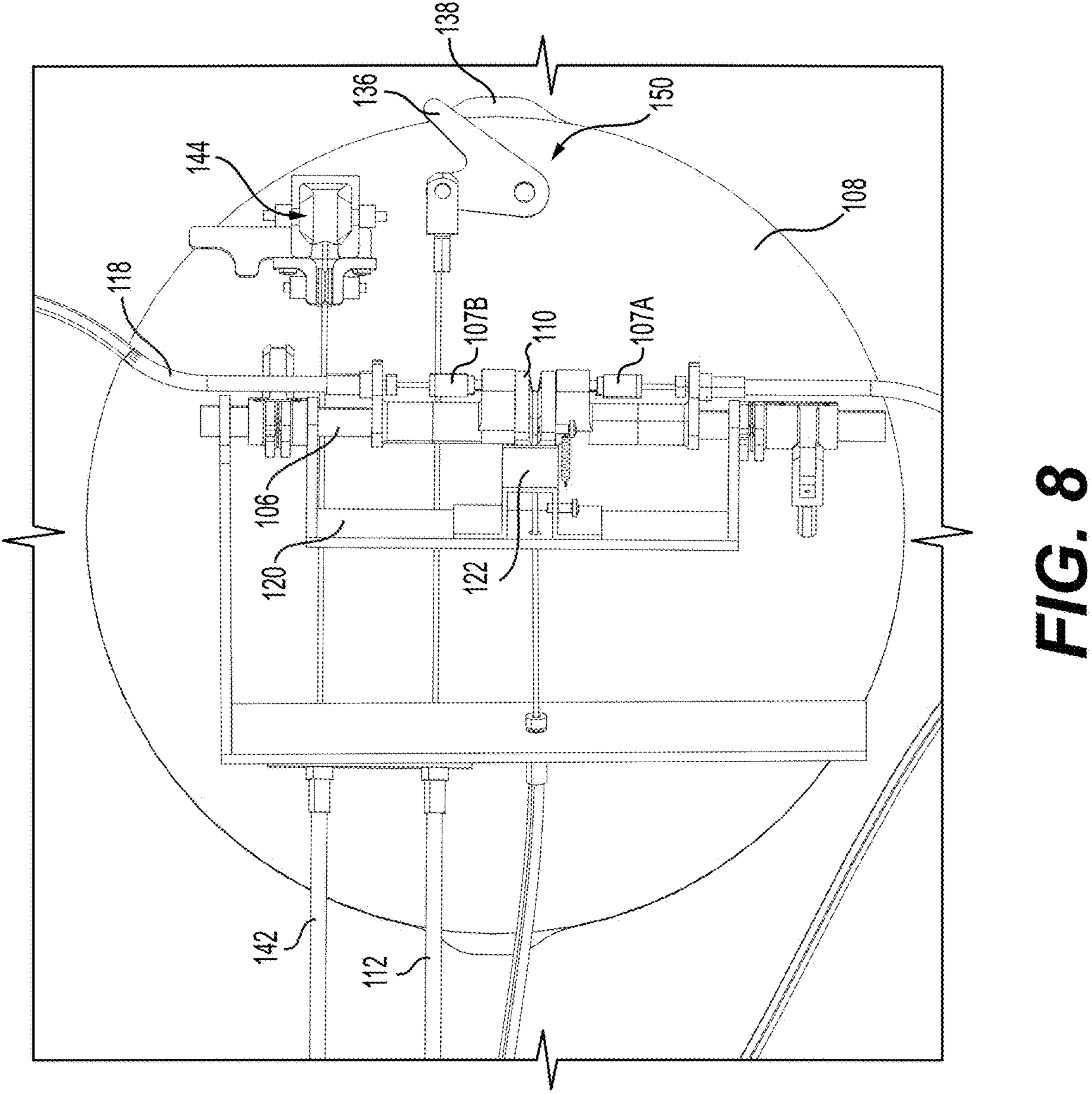
FIG. 8 is a top view of the mechanical logic-gate pivot tube of FIG. 1.

Shown in FIGS. 2A and 8, the swiveling and tracking ability of the seat is actuated through interaction with the seat's handle and substantially controlled using two spring pin plungers 104A and 104B and a forward-facing limiter system 150 (FIG. 6) and aft-tracking limiter system 129 (FIG. 5). The spring pin plunger 104A is mounted within the spring pin-pivot tube mounting enclosure 105A and the spring pin plunger 104B is mounted within the spring pin-pivot tube mounting enclosure 105B. Spring pin cable interfaces 107A and 107B are secured to the retractable side of the spring pin plungers 104A and 104B which allows for motion of the spring pin cable interface 107A or 107B to be translated into retraction or extension of the spring pin plunger 104A or 104B nose. Control of the extension and retraction of the spring pin plunger 104A is achieved with the transference of cable tension from the forward-facing swivel limiter system 150 through the forward-facing limit cable 112 and onto the spring pin-forward-facing limit cable interface 107A which is secured to one end of the spring pin plunger 104A. Similarly, the spring pin-aft-tracked limit cable interface 107B interacts with the aft-tracking limit cable 118 and is tensioned or compressed depending on the status of the aft-tracking limiter system 129 (FIG. 5). Similarly, the FIGS. 2A, 3, and 8, show the pivot tube 106, which may rotate along with the flywheel 110 about its longitudinal axis when certain conditions have been met.

Figure 4:
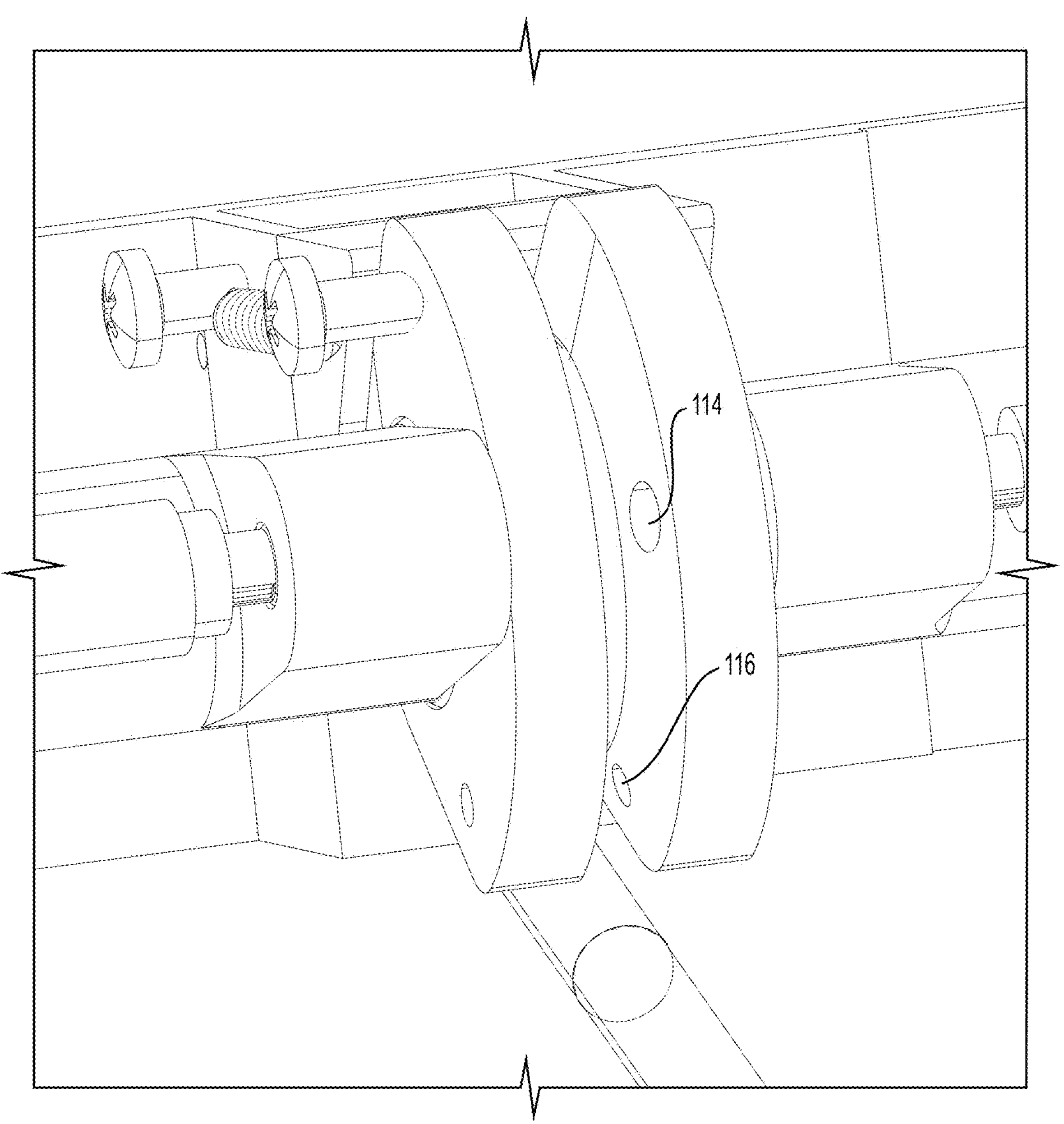
FIG. 4 is a close-up perspective view showing a flywheel control arm of the mechanical logic-gate pivot tube of FIG. 1.

Shown in FIGS. 1 and 2A the flywheel 110 is connected to the pivot tube 106 and positioned in between the spring pin-pivot tube mounting enclosures 105A and 105B. Shown in FIG. 4 the flywheel 110 has two holes, 114 and 116 each occurring on both flywheel control arms 110A and 110B. The through hole 114 allows for the spring pin plungers 104A and 104B to be engaged or disengaged corresponding to through hole 114. The pin hole 116 allows for a clevis pin or screw to be inserted and prevent the swivel locking control cable 142 from becoming unseated from the flywheel control arm cable interface 111. The flywheel 110 is able to rotate independently of the pivot tube 106 depending on the input status defined by the tension or lack of tension in the forward-facing limit cable 112 and the aft-tracking limit cable 118. The forward-facing limit cable 112 is positioned opposite the aft-tracking limit cable 118 and corresponds to the flywheel control arm 110A. The aft-tracking limit cable 118 is positioned opposite the forward-facing limit cable 112 and corresponds to the flywheel control arm 110B.

Figure 2B:
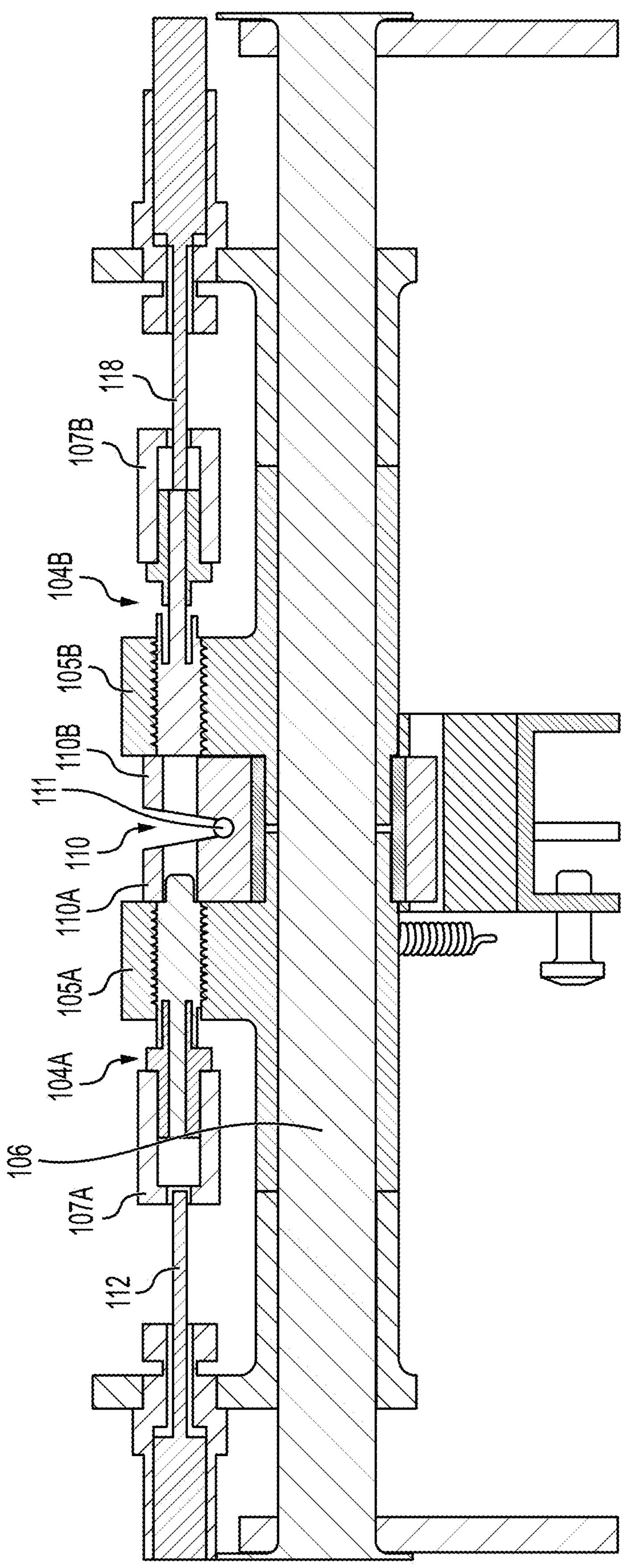
FIG. 2B is a cross-sectional view showing a spring pin plunger engaged with the flywheel and a spring pin plunger disengaged from the flywheel to illustrate the operation of the mechanical logic-gate pivot tube of FIG. 1 in accordance with some embodiments.

As best seen in FIG. 2A, the flywheel 110 comprises two arms 110A and 110B, one arm 110B connected to aft-tracking limit cable 118 and the other arm 110A connected to forward-facing limit cable 112. The engagement of the flywheel control arm 110B is caused from aft or fore-aft seat movement which decrease or increase the tension in the aft-tracking limit cable 118. The flywheel control arm 110B becomes engaged when the spring pin plunger 104B is inserted into the through hole 114 located on the flywheel control arm 110B. The spring pin plunger 104B is secured to the spring pin-pivot tube mounting enclosure 105B. The spring pin-aft-tracked limit cable interface 107B is attached on one end to the aft-tracking limit cable 118 and on the other end encases and mounts to the spring pin plunger 104B. When the aft-tracking limit cable 118 is tensioned or relaxed, the spring pin plunger 104B disengages or engages with the flywheel control arm 110B. For instance, when the seat is adjusted into a fully aft position and swiveled to a non-forward-facing direction, the aft-tracking limit cable 118 goes into tension and pulls the spring pin plunger 104B out of the flywheel control arm 110B while the forward-facing limit cable 112 is relaxed allowing for spring pin plunger 104A to remain engaged with flywheel control arm 110A, resulting in the partial disengagement of the flywheel 110 as seen in FIG. 2B.

Figure 2C:
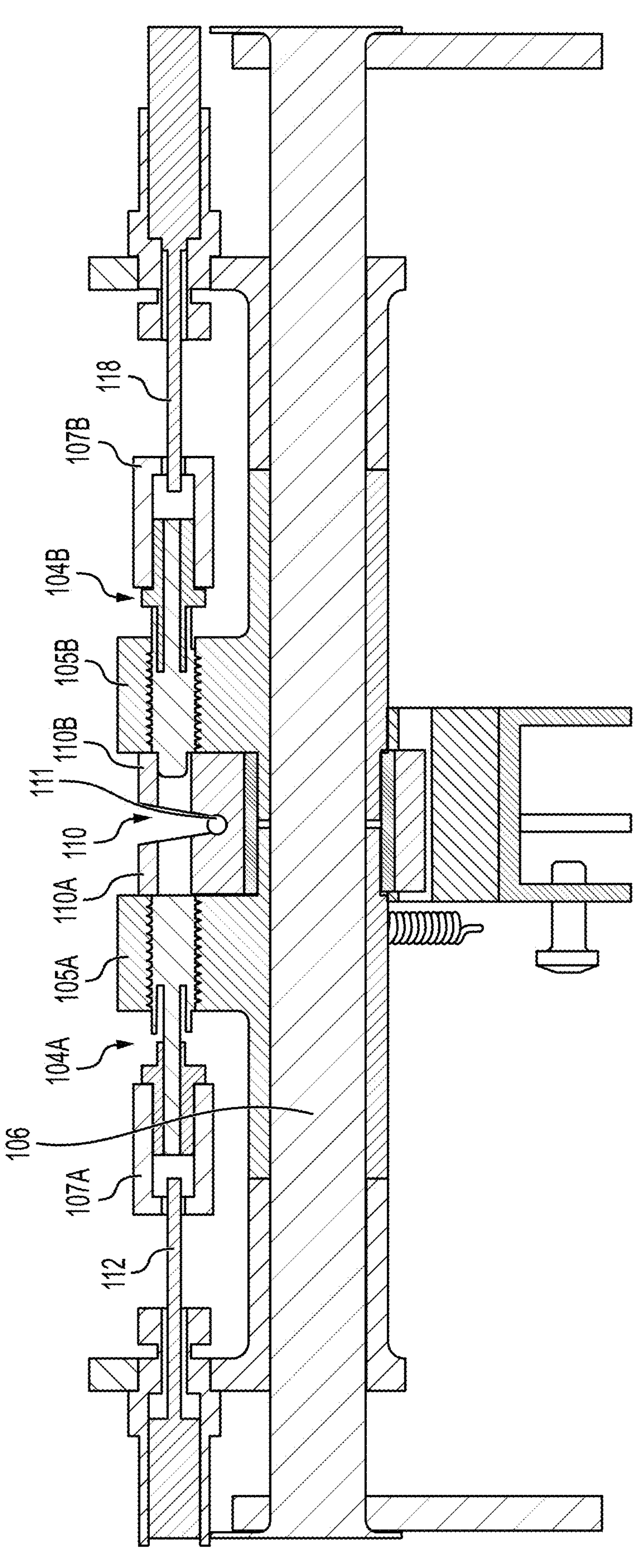
FIG. 2C is a cross-sectional view showing a spring pin plunger engaged with the flywheel and a spring pin plunger disengaged from the flywheel to illustrate the operation of the mechanical logic-gate pivot tube of FIG. 1 in accordance with some embodiments.

The flywheel control arm 110A functions similarly to the flywheel control arm 110B. The flywheel control arm 110A is engaged when the spring pin plunger 104A is inserted into the through hole 114 on the flywheel control arm 110A. The spring pin-forward-facing limit cable interface 107A is attached on one end to the forward-facing limit cable 112 and on the other end encases and mounts to the spring pin plunger 104A. The spring pin plunger 104A becomes engaged or disengaged with the flywheel control arm 110A when the forward-facing limit cable 112 is tensioned or relaxed. For instance, when the seat is swiveled into a forward-facing direction and tracked to a non-fully aft position, the forward-facing limit cable 112 is tensioned and pulls the spring pin plunger 104A out of the flywheel control arm 110A while the aft-tracking limit cable 118 is relaxed allowing for spring pin plunger 104B to remain engaged with flywheel control arm 110B, resulting in the partial disengagement of the flywheel 110 as seen in FIG. 2C.

Figure 2D:
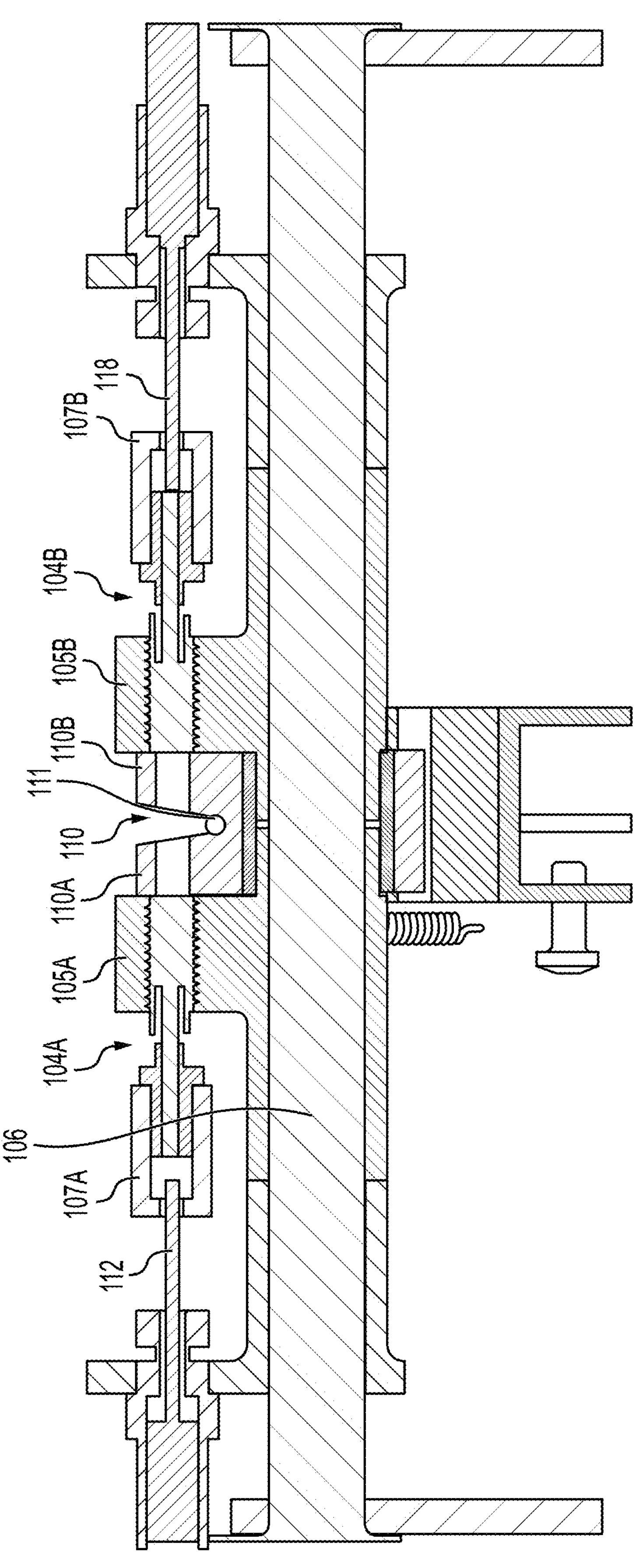
FIG. 2D is a cross-sectional view showing both spring pin plungers disengaged with the flywheel to illustrate the operation of the mechanical logic-gate pivot tube of FIG. 1 in accordance with some embodiments.

In operation, when the user operates the handle and tracks to a fully aft position and swivels the seat to a non-forward-facing direction, the tension in the aft-tracking limit cable 118 causes the spring pin plunger 104B to disengage from the flywheel control arm 110B resulting in partial disengagement of the flywheel 110. Partial disengagement means that one of the two of the spring pin plungers 104A or 104B are retracted from the flywheel 110 which allows the flywheel 110 to rotate with the pivot tube 106 when the handle is actuated. If the user then swivels to a forward-facing direction, the forward-facing limit cable 112 goes into tension and disengages the spring pin plunger 104A from the flywheel control arm 110A. When both spring pin plungers 104A and 104B are disengaged (i.e. retracted out of the through hole 114 as shown in FIG. 2D), then the seat is able to track inboard, outboard, forward, and aft, and is prevented from swiveling. If only one spring pin plunger 104A or 104B is disengaged as shown in FIGS. 2B and 2C, the seat is still able to swivel and track when the handle is operated.

The spring pin plungers 104A and 104B are either engaged or disengaged and define the input status of the forward-facing limiter system 150 and the aft-tracking limiter system 129. The input status corresponds to whether or not a spring pin plunger 104A or 104B is extended into the flywheel control arm 110A or 110B. When both spring pin plungers 104A and 104B retract from the flywheel control arm 110A and 110B, the pivot tube 106 is able to rotate some angular deflection away from its initial orientation independent of the flywheel 110, allowing the seat to track without being able to swivel. The pivot tube 106 is in its initial position when the passenger releases/disengages the handle, which locks a tracking lock system (not shown) resulting in the seat being unable to track. Any tracking lock system may be employed that controls the ability of an aircraft seat to track forward and aft and to lock the forward/aft position of the seat. The tracking lock system may be controlled via a cable operatively coupled to pivot tube 106 and may operate by using one of numerous different arrangements and should not be considered limiting within the scope of this application. When the spring pin plungers 104A and 104B are retracted or the handle is released the flywheel 110 angularly deflects via a return spring 126, shown in FIG. 3 and becomes engaged with the flywheel control arm return catching mechanism 122. The flywheel 110 is in its initial orientation when the swivel locking mechanism 144 is engaged with the swivel locking plate 134 and the seat is unable to swivel. The flywheel 110 returns to its initial position under multiple scenarios.

One possible scenario may be reached when the passenger disengages the handle, allowing the pivot tube 106 and flywheel 110 to return back to their initial position which relaxes the swivel locking control cable 142 such that engagement between the swivel locking mechanism 144 and swivel locking plate 134 is achieved, and the tracking lock system is engaged, thus preventing the seat from both tracking, and swiveling.

Another possible scenario may be reached when the passenger engages the handle while the seat is neither tracked fully aft nor swiveled to be forward-facing, such that the mechanical logic gate 102 resembles the configuration shown in FIG. 2A. Then while maintaining handle engagement, the passenger tracks and swivels the seat such that both the forward-facing limiter system 150 creates tension in the forward-facing limit cable 112 and the aft-tracking limiter system 129 creates tension in the aft-tracking limit cable 118 resulting in a configuration where; both spring pin plungers 104A and 104B are retracted from the flywheel control arm 110A and 110B such that the mechanical logic gate 102 resembles the configuration shown in FIG. 2D, which causes the flywheel 110 to disengage from the pivot tube 106 and return from its deflected position back into the direction of its initial position due to the influence of the return spring 126. The flywheel's 110 rotation continues until making contact with and engaging the flywheel control arm's return catching mechanism 122, which is orientated to halt the flywheel's 110 motion when it reaches its initial position. Returning the flywheel 110 back to its initial position results in the swivel locking control cable 142 relaxing which allows the swivel locking mechanism 144 to engage with the swivel locking plate 134, thus preventing the seat from swiveling. Due to the maintained handle engagement in this scenario, the pivot tube 106 remains deflected after the flywheel 110 is disengaged which means that tension is still being provided to the tracking lock system which results in the seat being unable to swivel while freely being able to track until the handle is released. The flywheel 110 may depart from its initial orientation when the forward-facing limit cable 112 and/or the aft-tracking limit cable 118 are relaxed and the spring pin plungers 104A and/or 104B are able to be extended when the flywheel 110 is rotated and the through hole 114 is aligned with the spring pin plungers 104A and 104B. The flywheel 110 is only able to return to its initial orientation during the scenario described second above when tension is added to both the aft-tracking limit cable 118 and forward-facing limit cable 112. The increase in tension allows the spring pin plungers 104A and 104B to retract from the flywheel 110 causing the flywheel 110 to disengage from the pivot tube 106 and return to its initial position with the assistance of the return spring 126, which causes the swivel locking control cable 142 to relax resulting in the swivel locking mechanism 144 to engage with the swivel locking plate 134 at hole 135 such that the seat is unable to swivel. If the spring pin plungers 104A and 104B are partially engaged (i.e. one of the spring pin plungers is extended into the flywheel 110 at through hole 114 shown in FIGS. 2B and 2C) the flywheel 110 is still able to rotate with the pivot tube 106 which allows the seat to track and swivel.

For instance, when both spring pin plungers 104A and 104B are extended into the flywheel 110 while the seat is in a non TTOL position (i.e. the seat is neither swiveled to a forward facing direction nor tracked to a fully aft position resulting in the configuration shown in FIG. 2A). When a user operates the handle and tracks to a fully aft position, tension is created in the aft-tracking limit cable 118 and disengages the spring pin plunger 104B. At this juncture, displayed in FIG. 2B, the flywheel 110 is still fixed to the pivot tube 106 reference frame due to the forward-facing limiter system 150 relaxing the forward-facing limit cable 112 which allows the spring pin plunger 104A to remain engaged with the flywheel 110, resulting in the swivel locking control cable 142 to remain tensioned such that the swivel locking mechanism 144 remains disengaged from the swivel locking plate 134, allowing the seat to swivel freely. If the user then swivels to a forward-facing direction, the forward-facing limit cable 112 is tensioned disengaging the spring pin plunger 104A resulting in the configuration shown in FIG. 2D. Both spring pin plungers 104A and 104B are disengaged and the flywheel 110 is released from the pivot tube 106 reference frame and returns to its initial orientation releasing tension in the swivel locking control cable 142. The release of tension in the swivel locking control cable 142 allows the swivel locking mechanism 144 to engage with the swivel locking plate 134 and prevent the seat from swiveling. If the user engages the handle the flywheel 110 is still isolated from the pivot tube 106 so the user may track inboard, outboard, and forward and aft.

In order to leave the TTOL position the user may again engage the handle and track the seat forward. The tension in the aft-tracking limit cable 118 will be dissipated and allow for the spring pin plunger 104B to release to the sidewall of the flywheel control arm 110B. When the user disengages the handle, the pivot tube 106 rotates back to its initial position allowing the spring pin plunger 104A to extend into and engage the flywheel control arm 110A, thus coupling the flywheel 110 and pivot tube 106 onto the same reference frame. Reengaging the handle allows the flywheel 110 to rotate with the pivot tube 106 resulting in the swivel locking mechanisms 144 disengagement with the swivel locking plate 134, and the seat may once again swivel freely.

Shown in FIGS. 1 and 3, the flywheel control arm return catching mechanism 122 is installed onto the mechanism frame 120 with mounts which allow the flywheel control arm return catching mechanism 122 to grasp the pivot tube 106 while the pivot tube 106 rotates. The flywheel control arm return catching mechanism 122 acts as a static reference frame to return the flywheel 110 back to its initial orientation. The flywheel 110 returns to its initial orientation when the seat is not able to swivel (i.e. when spring pin plungers 104A and 104B are both retracted from the flywheel 110, or when the handle is released allowing the pivot tube 106 and coupled flywheel 110 to return to their initial position). For instance, at the flywheel's 110 initial orientation, the engagement/disengagement of the spring pin plungers 104A and 104B have no impact on the seat's ability to swivel. When the handle is released, the flywheel 110 returns to the initial orientation. In this state, the inputs of the spring pin plungers 104A and 104B have no effect because the pivot tube 106 has also deflected back to its initial orientation. Furthermore, if the handle is engaged and the seat is both tracked fully aft and swiveled to be forward facing, the spring pin plungers 104A and 104B retract and the flywheel 110 is returned to the initial orientation due to tension provided by the return spring 126. In this returned state, tension in the swivel locking control cable 142 is reduced, allowing for the swivel locking mechanism 144 to engage with the swivel locking plate 134, thus preventing the seat from swiveling. When the flywheel 110 becomes disengaged from the pivot tube 106 due to spring pin plungers 104A and 104B becoming retracted, the flywheel 110 may abruptly release and result in a rapid rotation or pivoting motion due to any spring or cable tension. The flywheel control arm return catching mechanism 122 acts as a buffer to catch the flywheel 110 when it releases. The flywheel control arm return catching mechanism 122 may be fabricated from a rubber or soft foam material which conforms to the shape of the flywheel 110. The cushioned material acts as a damper for when both of the spring pin plungers 104A and 104B are released during the previously described second scenario and prevents the flywheel 110 from slamming backwards and creating an audible "clanging" noise. The swivel locking control cable 142 is fed from the flywheel control arm's cable interface 111 (FIG. 2A) through the flywheel control arm return catching mechanism 122 in an oversized hole (not shown) to reduce undesirable interactions with the swivel locking control cable 142. The swivel locking control cable 142 attaches to the swivel locking mechanism 144 and interacts with the flywheel 110 through the flywheel control arm cable interface 111 which translates flywheel 110 rotation into a displacement of cable travel, resulting in direct control over the swivel locking mechanism 144 depending on the relative angular orientation of the flywheel 110. A combination of tension from the swivel locking mechanism 144 and the return spring 126 act to rotate the flywheel 110 into the flywheel control arm return catching mechanism 122.

Shown in FIG. 3, a return spring 126 exists between the flywheel 110 and the return catching mechanism 122. The return spring 126 is depicted as a single spring and ensures the friction between the spring pin plungers 104A and 104B and the sidewalls of the flywheel 110 is inconsequential to the flywheel 110 returning to its initial position. The frictional force acting to prevent the flywheel control arm from rotating which, if left unaccounted for, could result in the inability of the spring pin plungers 104A and 104B to consistently engage with the flywheel 110 through hole 114. The interaction between the return spring 126 and the flywheel control arm return catching mechanism 122 may slightly increase the handle force, but serves as verification the system operated as intended during operation.

Shown in FIG. 5, the aft-tracking limit cable 118 and aft-tracked limit lever arm 132 is installed onto the side of the bucket frame 128. The aft-tracking limit cable 118 connects to an aft-tracking limiter system 129. The aft-tracking limiter system 129 translates the relative position of the seat to a linear displacement of the aft-tracking limit cable 118. The bucket frame 128 is non-static and allows the seat to track in a forward or aft direction within the aircraft cabin. The lateral tracking tube mount 130 is attached to the lateral tracking lock system which is then secured to the swivel plate 108 via a linear bearing that permits lateral motion following a two-dimensional path. Due to the inability of the lateral tracking lock system to move in the forward and aft direction we can treat anything mounted onto this system to be static in the forward and aft direction, thus the lateral tracking tube mount 130 is static in reference to forward and aft motion. A seat is able to track forward and aft in some arrangements by mounting a tracking tube perpendicular to the lateral tracking lock system, which is then secured to the bucket frame 128 with a linear bearing which permits forward and aft motion. Due to the limitations of linear bearings, and orientation of the forward and aft tracking tubes, the forward and aft tracking lock system is unable to move in a lateral direction. The motion permitted allows for the bucket frame 128 to move forward and aft relative to the static lateral tracking tube mount 130. The lateral tracking tube mount 130 includes a raised feature 133 that interacts with the aft-tracked limit lever arm 132 which allows for the relative tension in the aft-tracking limit cable 118 to correspond to the forward or aft position of the seat. For instance, when the seat is tracked in an aft direction on the bucket frame 128, the bucket frame 128 and aft-tracked limit lever arm 132 interact with the raised feature 133 on the lateral tracking tube mount 130 which creates tension in the aft-tracking limit cable 118. One end of the aft-tracking limit cable 118 is mounted onto the bucket frame 128 with a cable extending to the aft-tracked limit lever arm 132. The lever arm 132 is secured to and pivots on the bucket frame 128. The lateral tracking tube mount 130 is treated as a static reference frame which interacts with the aft-tracked limit lever arm 132 when the seat is tracked fully aft on the pedestal as shown in FIG. 5. The other end of the aft-tracking limit cable 118 is mounted directly onto the pivot tube 106 such that they both rotate about the same primary axis when the handle is actuated. The aft-tracking limit cable 118 is secured to the pivot tube 106 in a way that produces inconsequential cable travel during rotation with the pivot tube 106; the extension/retraction of the spring pin plunger 104B is substantially controlled with the aft-tracking limiter system 129. When the seat is tracked aft, the aft-tracked limit lever arm 132 interacts with the raised feature 133 on the lateral tracking tube mount 130 resulting in the aft-tracked limit lever arm 132 to rotate in a counterclockwise direction causing the aft-tracking limit cable 118 to undergo a linear displacement of cable which results in the disengagement of the spring pin plunger 104B, as shown in FIG. 2B. When the handle is engaged, both spring pin plungers 104A and 104B must be retracted (shown in FIG. 2D) for the seat to not be capable of swiveling. The retraction of one of the spring pin plungers 104A or 104B, as seen in FIGS. 2B and 2C, does not affect the ability of the seat to swivel.

Figure 6:
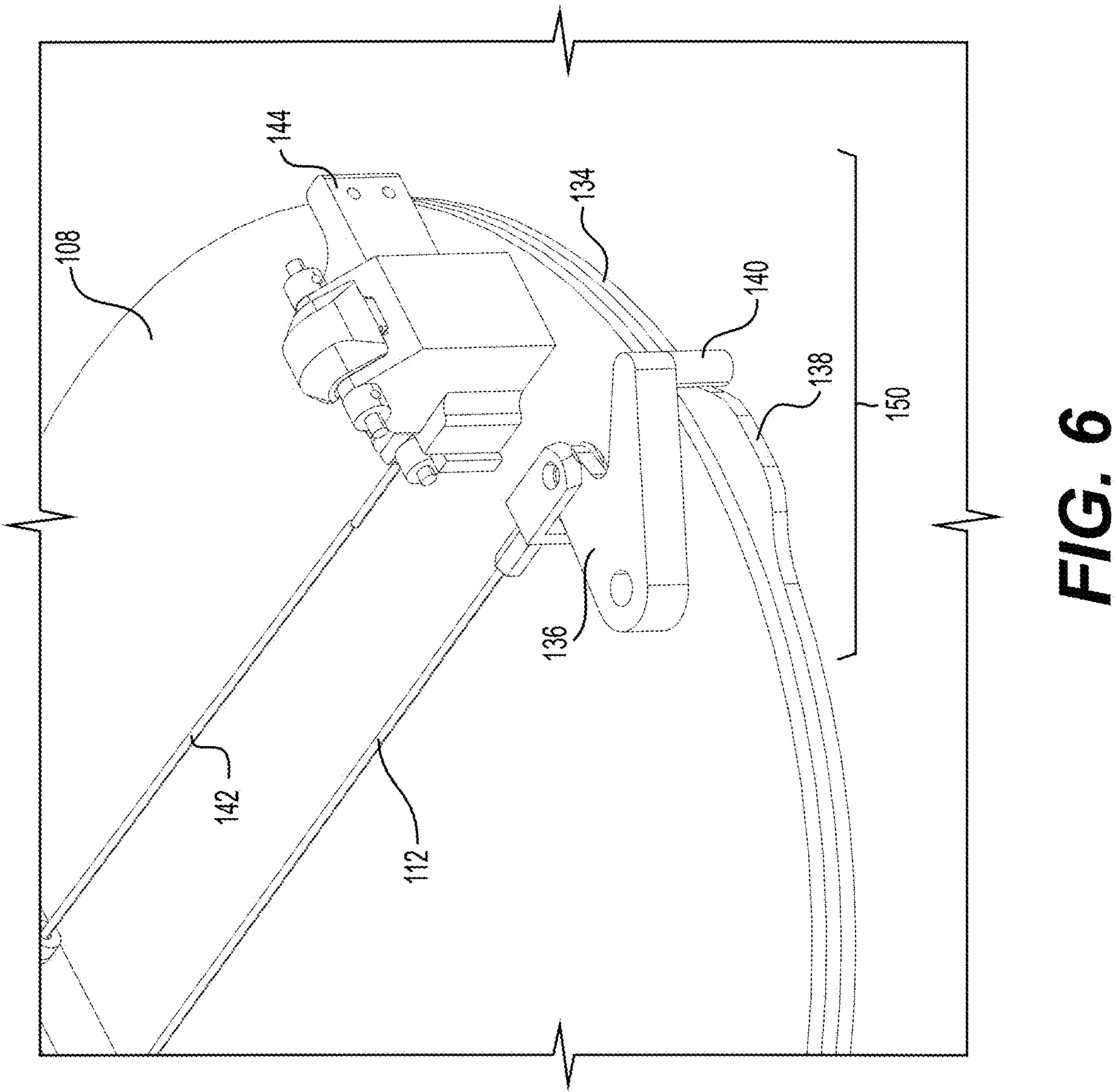
FIG. 6 is a perspective view of a swivel locking mechanism and forward-facing limiter system, in an embodiment.

Shown in FIGS. 1 and 6, the forward-facing limit cable 112 connects to the forward-facing limiter system 150. The forward-facing limiter system 150 interfaces with swivel plate 108 and swivel locking plate 134. The swivel plate 108, as shown in FIG. 1, has a substantially circular shape. Shown in FIG. 6, the swivel plate 108 is positioned on top of swivel locking plate 134 which has a slightly larger radius than the rest of the swivel plate 108. The swivel locking plate 134 is static and allows the swivel plate 108 to rotate on a fixed axis perpendicular to the swivel plate 108. The swivel locking plate 134 also includes a groove extension 138 which protrudes outwards a further distance than the standard radius of the swivel locking plate 134. The groove extension 138 increases the diameter of the swivel locking plate 134 for a segment at a position where the seat is in a forward-facing orientation. The swivel plate 108 includes a swing arm 136 which is installed onto the upper side along the edge substantially above the swivel plate 108 and swivel locking plate 134. The swing arm 136 includes an arm extension 140 which extends downward and beyond the outer radius of the swivel plate 108. The arm extension 140 includes rollers (not shown) on its surface facing the swivel plate 108 which follow the outer profile of the swivel locking plate 134. The forward-facing limiter system 150 translates seat direction into a linear displacement of the forward-facing limit cable 112. The swivel locking plate 134 interacts with the swing arm 136 and arm extension 140 to create one of the two inputs for the mechanical logic-gate 102 which interacts with the swivel locking mechanism 144 to prevent the seat from swiveling under certain conditions. For instance, when the seat is moved to a forward-facing orientation, the swivel plate 108 swivels and the arm extension 140 passes along the outer edge of the swivel locking plate 134. As the swing arm 136 pivots on the top face of the swivel plate 108, the arm extension 140 is forced to follow the extended groove profile 138 of the swivel locking plate 134. One end of the forward-facing limit cable 112 is mounted onto the swivel plate 108 and the other is installed directly onto the pivot tube 106 such that they both rotate about the same primary axis when the handle is actuated. The forward-facing limit cable 112 is secured to the pivot tube 106 in a way that produces inconsequential cable travel during rotation with the pivot tube 106; the extension/retraction of the spring pin plunger 104A is substantially controlled with the forward-facing limiter system 150. The arm extension 140 interacts with the extended groove profile 138 causing the swing arm to deflect and pivot in a clockwise direction which results in a linear displacement of the forward-facing limit cable 112 and creates tension in the forward-facing limit cable 112. When the seat is swiveled to be forward-facing, the forward-facing limit cable 112 is tensioned such that the spring pin plunger 104A is retracted out of the flywheel control arm 110A. When the seat is swiveled to a forward-facing orientation the arm extension 140 extends over the groove extension 138 and tension created in the forward-facing limit cable 112 disengages the spring pin plunger 104A. If the seat is also in a fully aft tracked position, the seat will be prohibited from swiveling, as both spring pin plungers 104A and 104B will be retracted as shown in FIG. 2D. Since this mechanism is engaged with passenger/seat inertia, it will not affect the force required to operate the handle.

Figure 7:
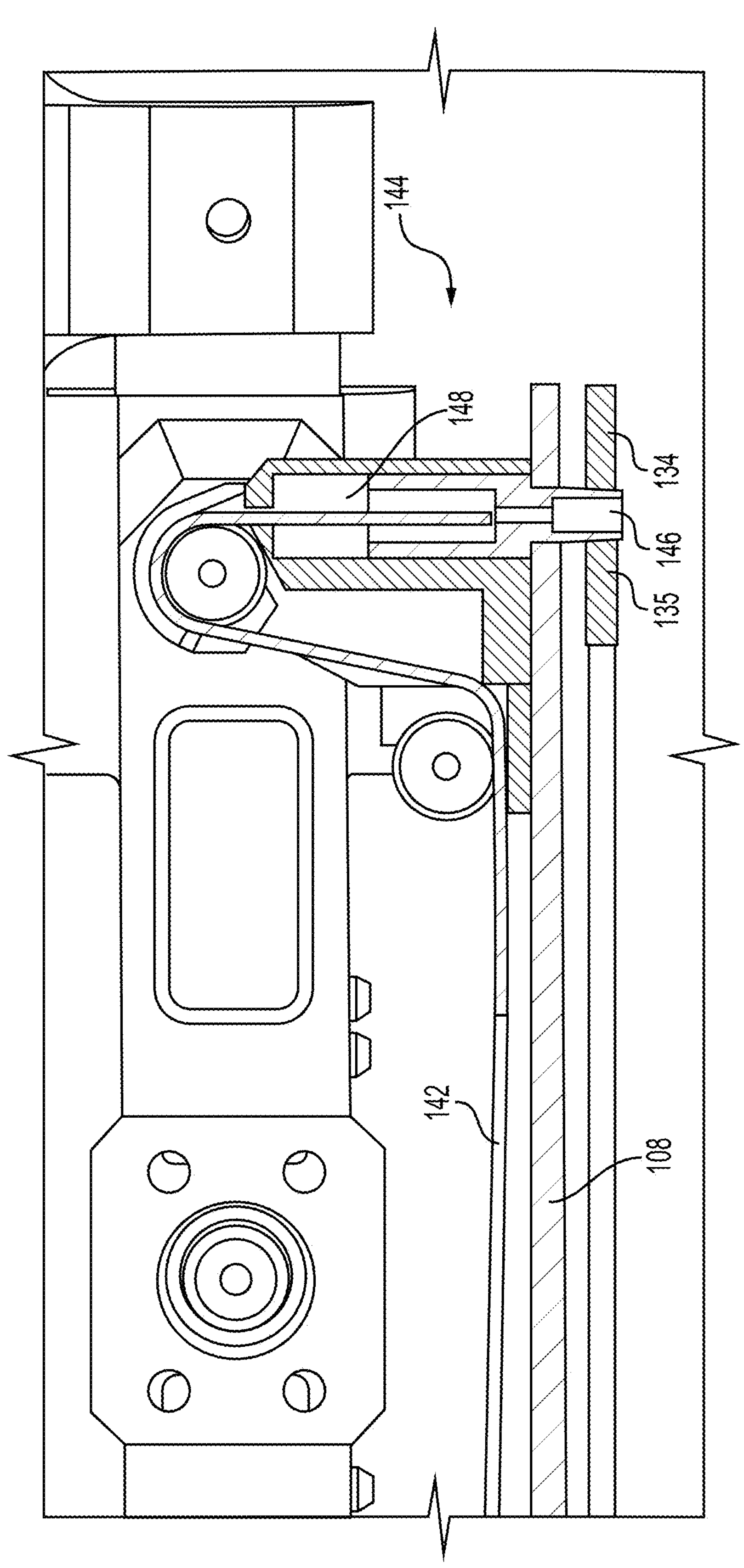
FIG. 7 is a cross-sectional view showing internal components of the swivel locking mechanism of FIG. 6.

Shown in FIG. 7, in an embodiment, the swivel locking mechanism 144 includes a pin hole system which is controlled through a linear displacement of the swivel locking control cable 142. The swivel locking mechanism 144 prevents the seat from swiveling when it is in a fully aft and forward-facing position, or when the handle is released. The pin 146 on the underside of the swivel locking mechanism 144 travels in a linear upwards and downwards motion with a change in the linear displacement of the swivel locking control cable 142. When a sufficient amount of slack in the swivel locking control cable 142 is achieved which is consistent with the seat being in a fully aft and forward-facing position or when the handle is released, then the pin 146 is released into the hole 135 on the swivel locking plate 134 due to the compression spring 148 (not shown in FIGS.) which acts to apply constant compression onto the pin 146 such that any slack experienced in the swivel locking control cable 142 results in releasing the pin 146 and locking the swivel plate 108 into place and preventing the seat from swiveling. The swivel locking mechanism 144 may use a plurality of different arrangements to lock the seat into a fully aft and forward-facing position and should not be considered limiting within the scope of this application.

The arrangement disclosed within embodiments comprises four mechanisms which include the mechanical logic-gate 102, flywheel control arm return catching mechanism 122, aft-tracking limiter system 129, and the forward-facing limiter system 150. The AND gate assembly uses both the forward-facing limiter system 150 and the aft-tracking limiter system 129 as inputs which determine how much cable tension is outputted to the swivel locking control cable 142 which engages or disengages the swivel locking mechanism 144. This is possible because the ability to create tension in the swivel locking control cable 142 is dependent on whether the flywheel 110 (FIG. 1) is engaged with the spring pin plungers 104A and/or 104B (FIGS. 2A, 2B, 2C, 2D) mounted onto the pivot tube 106 mechanism and if the handle is engaged.

The flywheel 110 can rotate independently on the pivot tube 106 when both spring pin plungers 104A and 104B are disengaged (FIG. 2D), thus becoming liberated from the pivot tube's 106 reference frame allowing the flywheel 110 to undergo an angular rotation back to its initial position. The initial position creates slack in the swivel locking control cable 142 which allows the swivel locking mechanism 144 to engage with the swivel locking plate 134 and prevent the seat from swiveling until the system inputs are reset. The flywheel 110 interfaces with both spring pin plungers 104A and 104B through two holes 114 placed on opposing faces of the part. The flywheel 110 includes a flywheel control arm cable interface 111 which is a constant radius cable sheave that pulls the swivel locking control cable 142 at a constant rate for a given angular deflection.

Shown in FIG. 9 is an input and output table showing the possible inputs and outputs for the mechanical logic-gate 102. The input values are either true or false and correspond to the status of the spring pin plungers 104A and 104B. A false value (0) indicates a spring pin plunger 104A or 104B is engaged and extends into the flywheel 110 at through hole 114. A true value (1) indicates a spring pin plunger 104A or 104B is not engaged and is retracted from the flywheel 110. The true and false values are arranged into two input columns with one column indicating if the seat is swiveled to a forward-facing position and the other column indicating if the seat is tracked to a fully aft position. The output values include a first and second swivel locking control cable 142 throw distance. A throw distance correlates to the linear displacement of the swivel locking control cable 142 which provides tension to the swivel locking mechanism 144. For instance, a first throw distance of the swivel locking control cable 142 may be a throw distance of 0.65 inches and a second throw distance of the swivel locking control cable 142 may be a throw distance of 0 inches. A throw distance of 0 inches indicates the seat is unable to swivel. A throw distance of 0.65 inches indicates that the seat is able to swivel freely when the handle is activated. Referring back to FIG. 9, when both input values are false, the corresponding output is a swivel locking control cable 142 throw distance of 0.65 inches. When one input value is true, and the other value is false the swivel locking control cable 142 has a throw distance of 0.65 inches. If both input values are true, the swivel locking control cable 142 has a throw distance of 0 inches. The output throw distance of the swivel locking control cable 142 may vary and should not be considered limiting within the scope of this application. The outputs should be viewed as two different values of a first and a second throw distance of the swivel locking control cable 142. The first and second throw distance output is dependent on the input values.

Figure 10:
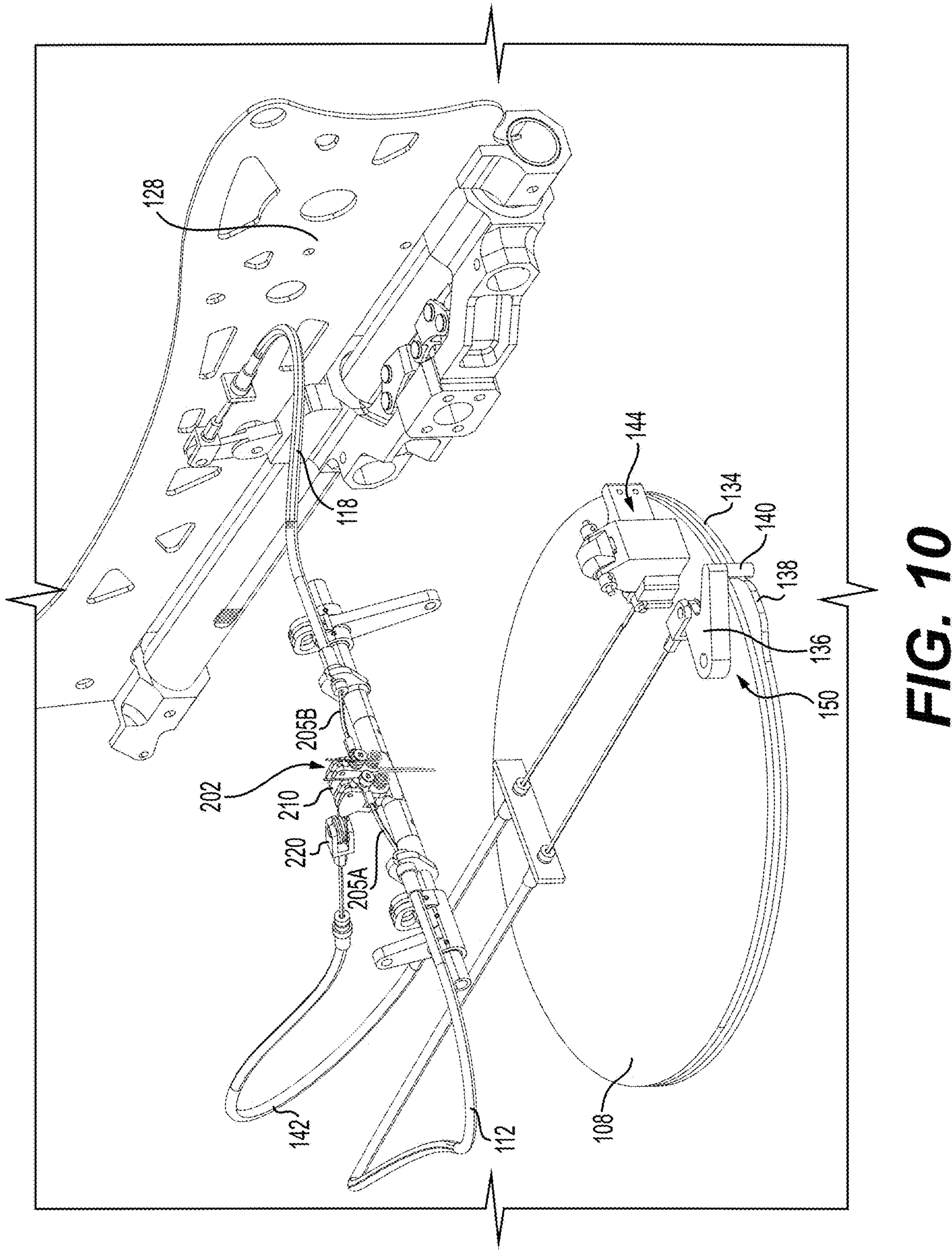
FIG. 10 is a top perspective view of a control horn logic-gate pivot tube in an embodiment.

Shown in FIGS. 10-13, in an alternative embodiment, the swiveling ability of the aircraft seat is substantially controlled using a control horn pivot tube 202. In FIG. 10, the control horn pivot tube 202 includes control horns 210 which are connected to a pulley 220. The control horns 210 are each connected to pivot wires 205A and 205B. The pivot wire 205A is connected to the forward-facing limit cable 112 and the pivot wire 205B is connected to the aft-tracking limit cable 118.

Figure 13:
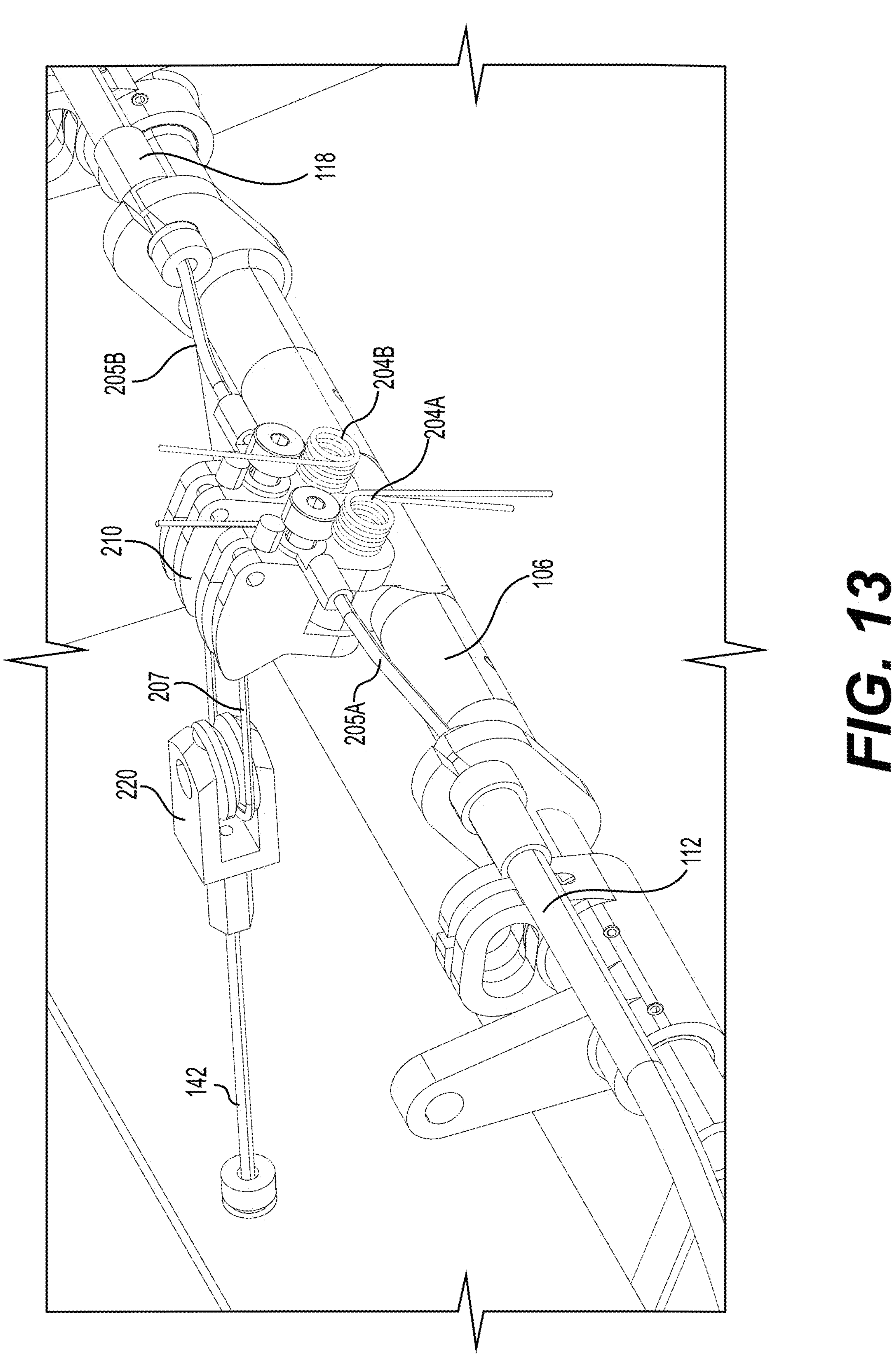
FIG. 13 is a close-up perspective of the control horn logic-gate of FIG. 10.

Shown in FIG. 13 the control horns 210 each include a torsion spring 204A and 204B positioned on each horn. The control horns 210 also include a pulley cable 207 which attaches to each control horn 210 and wraps around the pulley 220. The pivot tube 106 rotates along its longitudinal axis as done in the mechanical logic-gate 102 arrangement.

Figure 11:
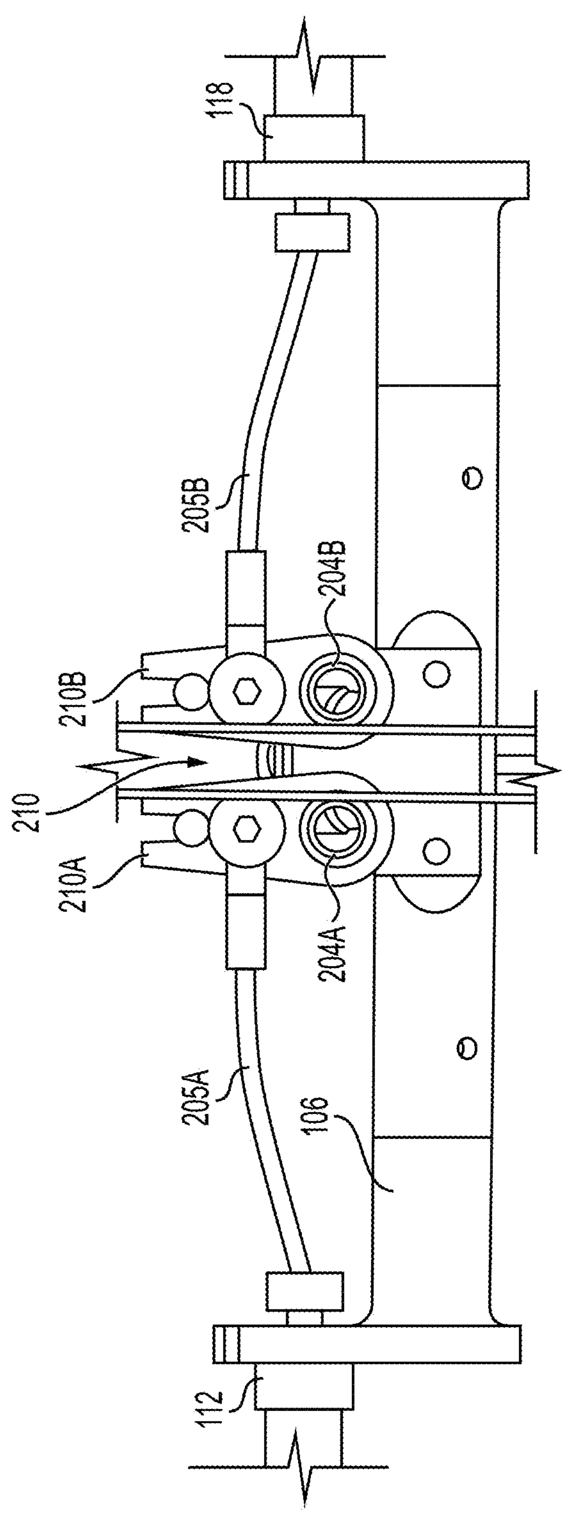
FIG. 11 is a front view of the control horn logic-gate pivot tube of FIG. 10.
Figure 12:
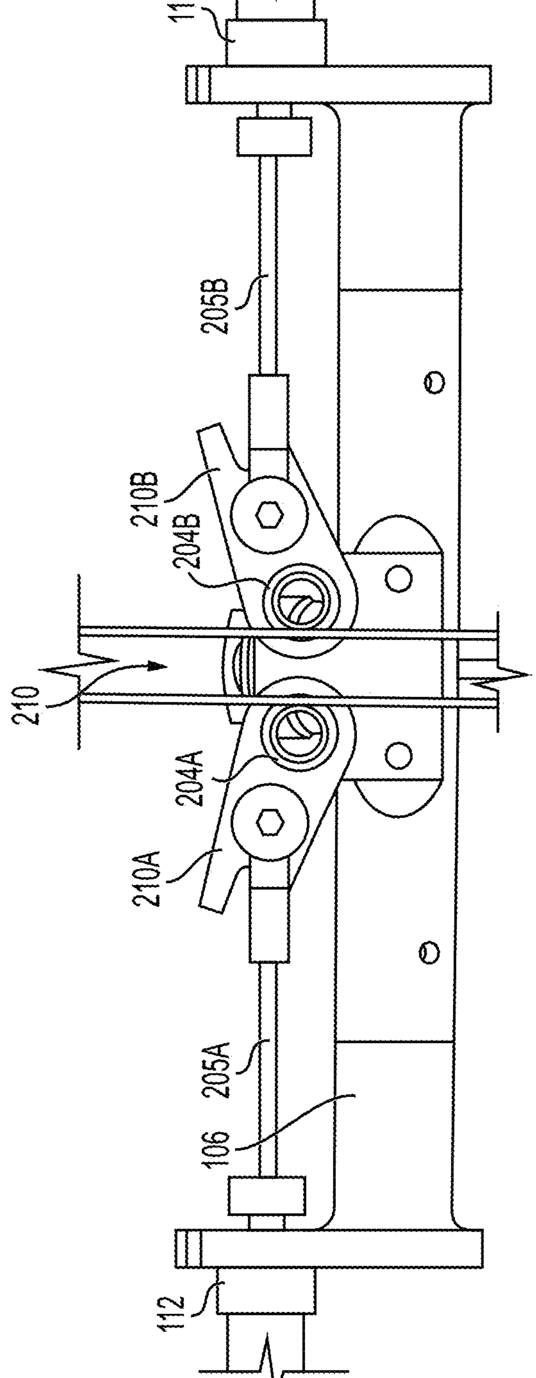
FIG. 12 is a front view of a pivoted control horn of the control horn logic-gate pivot tube of FIG. 10.

Shown in FIG. 11, the pivot wire 205A connects to the control horn 210A and the pivot wire 205B connects to the control horn 210B. In FIG. 12 the control horn 210A becomes deflected when tension is created in the forward-facing limit cable 112 which pulls on the pivot wire 205A. Similarly, the control horn 210B becomes deflected when tension is created in the aft-tracking limit cable 118 which pulls on the pivot wire 205B. When one of the control horns 210 is deflected, the pulley cable 207 is pulled and results in the pulley 220 moving directionally towards the control horns 210. When the pulley 220 moves towards the control horns 210 the swivel locking control cable 142 is pulled which engages the swivel locking mechanism 144. Much like in the mechanical logic-gate 102 the engagement or disengagement of the swivel locking mechanism 144 substantially controls whether the seat is allowed to swivel.

The control horn pivot tube 202 includes the aft-tracking limiter system 129 and forward-facing limiter system 150 which interact with the swivel locking mechanism 144 to control the swiveling capability of the seat. The forward-facing limiter system 150 and the aft-tracking limiter system 129 function similarly and include similar elements as described with the mechanical logic-gate 102 above.

Shown in FIG. 14 is an input and output table showing the possible inputs and outputs for the control horn pivot tube 202. The input values are either true or false and correspond to the status of the control horns 210. A false value (0) indicates a control horn 210 is not deflected. A true value (1) indicates a control horn 210 is deflected. The true and false values are arranged into two input columns with one column indicating if the seat is swiveled to a forward-facing position and the other column indicating if the seat is tracked to a fully aft position. The output values include a first, second, and third swivel locking control cable 142 throw distance. For instance, a first throw distance of the swivel locking control cable 142 may be a throw distance of 0.65 inches, a second throw distance of the swivel locking control cable 142 may be a throw distance of 0.55 inches, and a third throw distance may be a throw distance of 0.45 inches. Referring back to FIG. 14, when both input values are false, the corresponding output is a swivel locking control cable 142 throw distance of 0.65 inches. When one input value is true, and the other value is false, the swivel locking control cable 142 has a throw distance of 0.55 inches. If both input values are true, the swivel locking control cable 142 has a throw distance of 0.45 inches. Output values of 0.45 inches may indicate the swivel locking control cable 142 is unable to fully retract the swivel locking mechanism 144 from the swivel locking plate 134, resulting in the seat being unable to swivel when the handle is operated. Input values of 0.55 inches and 0.65 inches may indicate that the seat is able to fully retract the swivel locking mechanism 144 from the swivel locking plate 134, resulting in the seat being able to swivel freely when the handle is operated.

The output throw distance of the swivel locking control cable 142 may vary and should not be considered limiting within the scope of this application. The outputs should be viewed as three different values of a first, a second, and a third throw distance of the swivel locking control cable 142. The first, second, and third throw distance outputs are dependent on the input values.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A mechanical logic-gate system for an aircraft seat comprising:

- a flywheel having a first control arm and a second control arm, wherein the flywheel is operatively coupled to a pivot tube configured to control a plurality of control cables;
- a first spring pin plunger configured to disengage with the first control arm via tensioning of a first cable, and a second spring pin plunger configured to disengage with the second control arm via tensioning of a second cable; and
- a return spring configured to bias rotation of the flywheel in a first direction such that upon the first and second spring pin plungers both being disengaged with the first and second control arms of the flywheel, respectively, the return spring rotates the flywheel thereby disabling swiveling capability of the aircraft seat; and
- the aircraft seat being enabled to swivel when at least one of the first or second spring pin plungers are engaged with the first or second control arms of the flywheel, respectively.

2. The system of claim 1 wherein the first cable is a forward-facing limit cable and the second cable is an aft-tracking limit cable.

3. The system of claim 2 wherein the swivel of the aircraft seat to a forward-facing orientation causes the forward-facing limit cable to be tensioned when the aircraft seat is swiveled to a forward-facing orientation and tracking the aircraft seat to a fully aft position causes the aft-tracking limit cable to be tensioned when the aircraft seat is tracked to a fully aft position.

4. The system of claim 1 wherein when the first and second spring pin plungers are disengaged, the return spring causes the flywheel to rotate which creates a reduction of tension in a swivel locking control cable thereby triggering engagement of a swivel locking mechanism to disable swiveling capability of the aircraft seat.

5. The system of claim 4 wherein the swivel locking mechanism comprises a swivel locking plate configured to engage with the swivel locking control cable to disable swiveling of the aircraft seat.

6. The system of claim 1 comprising a first spring pin-pivot tube mounting enclosure and a second spring pin-pivot tube mounting enclosure, wherein the first and second spring pin-pivot tube mounting enclosures each secure the first and second spring pin plungers, respectively, onto the pivot tube.

7. A mechanical logic-gate system for an aircraft seat comprising:

- a mechanical logic-gate operatively coupled to a pivot tube, wherein the pivot tube is operatively coupled to a plurality of control cables for controlling a plurality of seat adjustment locking mechanisms by rotating about a longitudinal axis of the pivot tube, the mechanical logic-gate comprising:
  - a flywheel having a first control arm and a second control arm, wherein the flywheel is configured to rotate about the pivot tube independently of the pivot tube;
  - a swivel locking control cable operatively coupling the flywheel to a swivel locking mechanism;
  - a first spring pin plunger mechanically coupled to the pivot tube on a first side of the flywheel, wherein the first spring pin plunger comprises a spring-loaded pin extending from a first limit cable; and
  - a second spring pin plunger mechanically coupled to the pivot tube on a second side of the flywheel opposite the first side, wherein the second spring pin plunger comprises a spring-loaded pin extending from second limit cable,
  - wherein the first spring pin plunger is configured to insert into a hole of the first control arm of the flywheel and the second spring pin plunger is configured to extend into a hole of the second control arm of the flywheel such that the flywheel actuates the swivel locking mechanism based on tension of the first limit cable and/or the second limit cable, wherein the actuation of the swivel locking mechanism is achieved by rotation of the pivot tube based on coupling of the pivot tube and the flywheel.

8. The system of claim 7 wherein extension of at least one of the first and second spring pin plungers into the first or second control arm of the flywheel causes the aircraft seat to be enabled to swivel and track.

9. The system of claim 7 wherein retraction of both the first and second spring pin plungers from the first and second control arms of the flywheel, causes the aircraft seat to be disabled to swivel and enabled to track.

10. The system of claim 7 comprising a handle, wherein engagement of the handle is configured to add tension to a swivel locking control cable for disengaging the swivel locking mechanism, enabling swiveling of the aircraft seat, and, when disengaged, the handle causes the swivel locking control cable to relax which engages the swivel locking mechanism and disables swiveling of the aircraft seat.

11. The system of claim 7 wherein the swivel locking mechanism includes a pin configured to extend and retract in a hole formed in a swivel locking plate wherein tension in the swivel locking control cable pulls the pin out of the swivel locking plate and enables swiveling of the aircraft seat, and slack in the swivel locking control cable extends the pin into the swivel locking plate and disables swiveling of the aircraft seat.

12. The system of claim 7 wherein the first limit cable causes the first spring pin plunger to retract from the first control arm when the aircraft seat is forward-facing.

13. The system of claim 7 wherein a forward-facing limiter system comprises:

a swivel plate rotatably mounted to a swivel locking plate; and a swing arm configured to follow an outer edge of the swivel locking plate wherein the outer edge includes an extended groove profile.

14. The system of claim 13 wherein the swing arm is attached to the first limit cable and is configured to tension the first limit cable when the swing arm follows the extended groove profile.

15. The system of claim 13 wherein the extended groove profile is positioned on the swivel locking plate corresponding to a position where the aircraft seat is forward facing.

16. The system of claim 7 wherein the second limit cable retracts the second spring pin plunger from the second control arm when the aircraft seat is in a fully-aft position.

17. The system of claim 7 wherein an aft-tracking limiter system includes a bucket frame and a lever arm configured to add tension to the second limit cable when the aircraft seat is tracked fully aft on the bucket frame.

18. The system of claim 7 comprising a returning mechanism configured to rotate the flywheel and therefore the pivot tube when both the first and second spring pin plungers are retracted from the first and second control arms, respectively.

19. A mechanical logic-gate system for an aircraft seat comprising:

a flywheel operatively coupled to a pivot tube and to a plurality of control cables wherein the pivot tube is configured to rotate independently of the flywheel when a first and second spring pin plunger are disengaged from the flywheel;

the aircraft seat being disabled from swiveling when the first and second spring pin plungers are retracted from the flywheel; and the aircraft seat being enabled to swivel when at least one of the first or second spring pin plungers are engaged with the flywheel causing the pivot tube to rotate with the flywheel.

20. The system of claim 19 wherein a forward-facing limiter system controls the engagement/disengagement of the first spring pin plunger with the flywheel and an aft-tracking limiter system controls the engagement/disengagement of the second spring pin plunger with the flywheel such that the aircraft seat is automatically prevented from moving when the seat is fully-aft and forward facing.

* * * * *